May 5, 1964

C. F. SPEICHER ETAL 3,131,492

WEIGHT DISTRIBUTING AND DITCHING CONTROL MECHANISM

Filed March 22, 1962

INVENTORS
CARL F. SPEICHER
and
BY MARCUS E. SPEICHER

Robb + Robb
attorneys

May 5, 1964      C. F. SPEICHER ETAL      3,131,492
WEIGHT DISTRIBUTING AND DITCHING CONTROL MECHANISM
Filed March 22, 1962      2 Sheets-Sheet 2
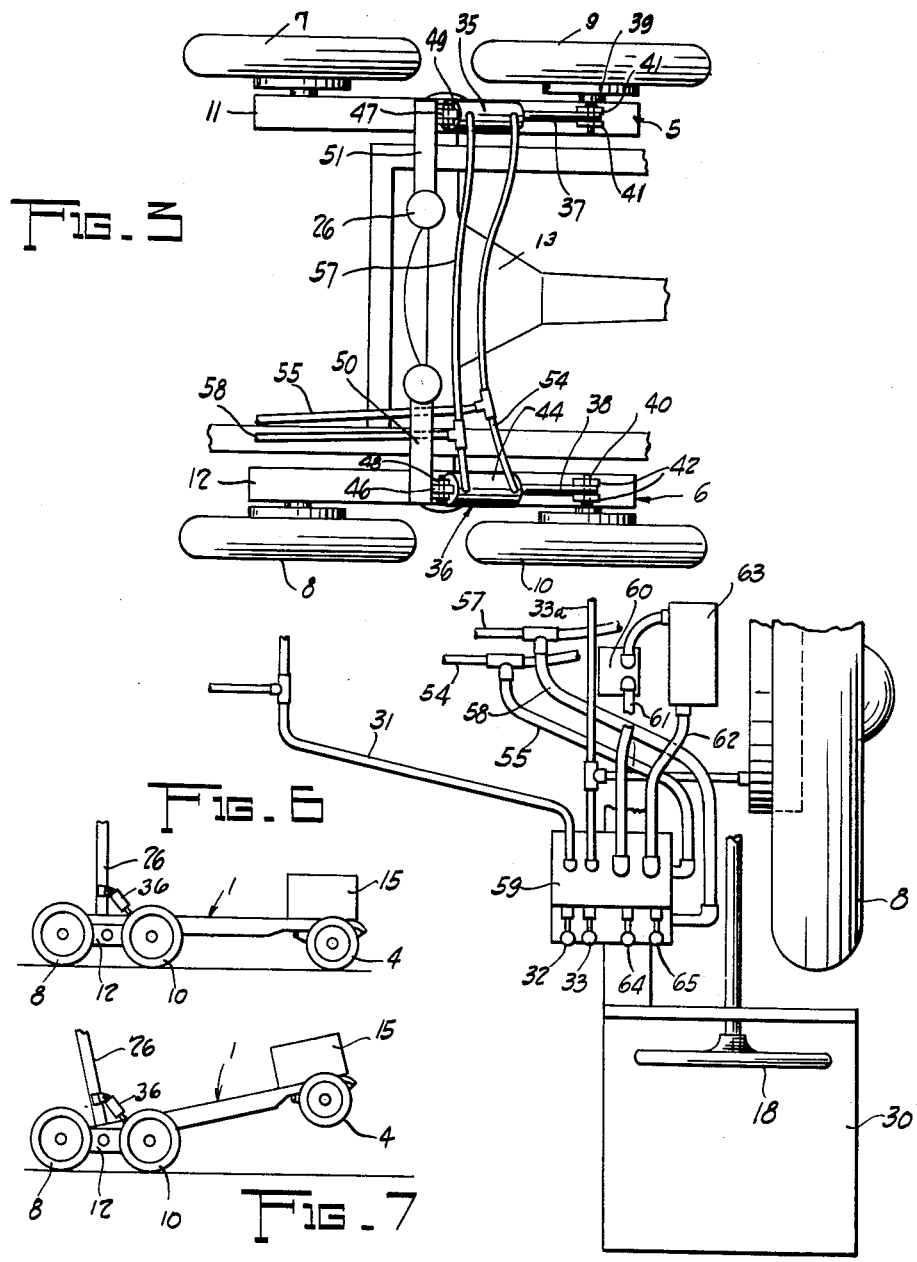
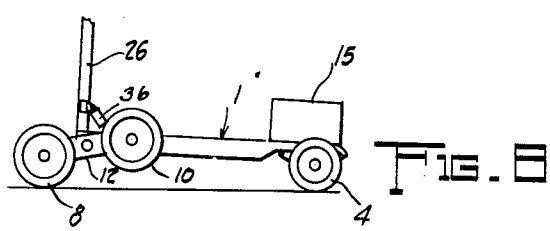
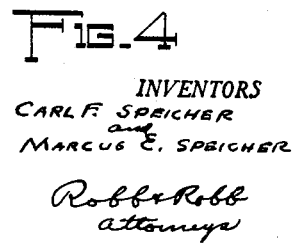
INVENTORS
CARL F. SPEICHER
and
MARCUS E. SPEICHER
BY
Robb & Robb
attorneys

United States Patent Office 3,131,492
Patented May 5, 1964

3,131,492
WEIGHT DISTRIBUTING AND DITCHING CONTROL MECHANISM
Carl F. Speicher and Marcus E. Speicher, Celina, Ohio, assignors to Speicher Brothers, Inc., Celina, Ohio, a corporation of Ohio
Filed Mar. 22, 1962, Ser. No. 181,724
2 Claims. (Cl. 37—94)

This application is a continuation in part of application Serial No. 421,556 filed April 7, 1954, now abandoned.

This invention relates to vehicles and is particularly adapted for use in trenching machines of the vehicular type, although not necessarily limited thereto.

More specifically the invention is especially useful in a machine which is self-transportable from job to job at normal road speeds, with usual steering and braking control provided therefor, and yet susceptible of carrying out the working phases for which it is designed. Such phases involve provision for adequate traction and directional control under widely varying conditions, and by availing of novel instrumentalities such characteristics are amply provided, without sacrifice of the mobility desired.

While heretofore trenching operations have been carried out for example by machines equipped with crawler tracks for travel movement and support in order to obtain low unit ground pressure, the transporting of such machines has of necessity been effected by trailer or heavy separate truck vehicles, for known reasons of complicated and relatively slow movement of the track with its associated supporting parts.

The present machine provides all of the desirable operating characteristics and yet is mounted on the usual rubber tired wheels, the tractive effort and control being enhanced by novel means, whereby the weight of the vehicle may be shifted so to speak and divided or concentrated where desired in respect to its supporting and/or driving parts.

A further consequence of the above arrangement is, that when the weight shifting means are incorporated in a trenching machine for example, additional control of the trenching elements may be accomplished during operation, such control involving positioning of the trenching mechanism.

Although rubber tired wheels are described as being provided, it will be apparent that other types of supporting and driving members may be availed of without sacrificing all of the advantages which are obtained by mounting a machine on such members.

Therefore one of the principal objects of this invention is to provide a vehicle wherein the weight thereof may be shifted so as to be concentrated or otherwise distributed on travel supporting members thereof.

A further object of the invention is to provide a novel arrangement of the supporting means of a vehicle, whereby operating devices may be availed of to regulate the distribution of the weight of the vehicle with respect to said means.

A stitll further object of the invention is to so arrange the parts that all of the weight of a vehicle may be concentrated on the drive means therefor.

Another object of the invention is to provide for shifting the directional control of a vehicle to either the driving and supporting members or to the usual steering parts provided.

A still further object of the invention is to provide a novel arrangement of the parts, whereby both steering and driving functions of a vehicle may be effected by the driving wheels or supporting members and additional weight may be in effect added to the driving wheels to insure improved traction.

Yet another object of the invention is to avail of what are in effect, weight shifting means to vary the operating attitude of work performing members supported on a vehicle.

A further object of the invention is to provide a vehicle equipped with hydraulic instrumentalities connected to tandem drive units for raising and lowering the steering wheels with respect to the ground and means for steering the vehicle when the usual steering wheels are out of contact with the ground.

Other and further objects of the invention will be understood from a consideration of the specification appended hereto and shown in the drawings wherein:

FIGURE 4 is a plan view enlarged and of fragmentary nature showing certain of the control elements and their relation to other of the parts of the vehicle.

FIGURE 5 is a top plan view largely diagrammatic illustrating the brake controls desirably provided in the vehicle.

FIGURES 6, 7, and 8 are diagrammatic views showing the various extreme positions which the vehicle may assume under control of the operating instrumentalities and control means furnished, intermediate positions being contemplated.

Figure 1:
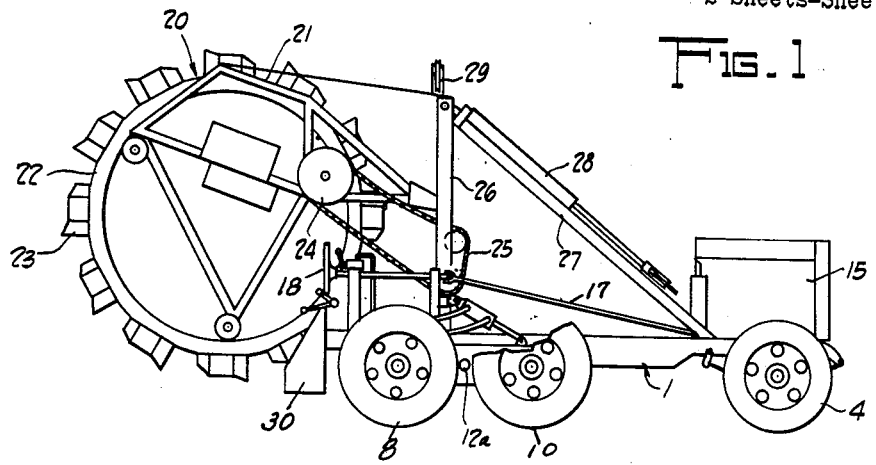
FIGURE 1 is a view in elevation showing the form of vehicle in which the drive or characteristics of this invention are incorporated.
Figure 2:
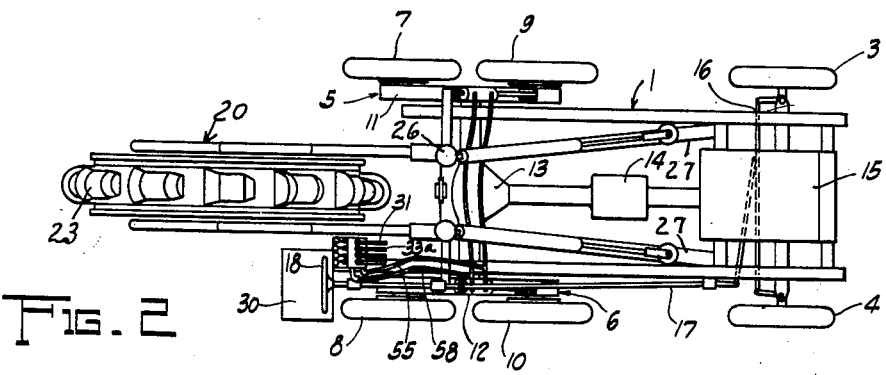
FIGURE 2 is a top plan view of such a vehicle, certain of the parts being omitted in order to more clearly illustrate those directly concerned herewith.

Referring initially to FIGURES 1 and 2, the vehicle of this invention is shown as what is known as a ditching machine, as a typical example of the manner in which the invention may be availed of, the frame of the machine being designated generally 1, and provided at the front thereof with the usual steering and supporting wheels 3 and 4.

At the rear the vehicle is supported by what may be termed the bogies or tandem drive units 5 and 6 respectively and generally, said bogies or drive units 5 and 6 including in each the pair of wheels 7 and 9 for the bogie 5 and 8 and 10 for the bogie 6.

As will be understood the bogies 5 and 6 include also the beams 11 and 12 respectively, the said beams being pivotally connected to the drive axle at substantially the center thereof as indicated in FIGURE 1 at 12a. It will be understood further that the drive to the respective bogies 5 and 6 is effected by means of a differential unit as for example indicated at 13, the differential unit being in turn connected with a transmission 14 of conventional form, the transmission unit 14 being driven by an engine or motor 15 mounted at the forward part of the vehicle and above the usual steering and supporting wheels 3 and 4 previously mentioned.

The wheel 3 and 4 as indicated, are of the automotive steering type, including the usual tie-bar 16 connecting the spindles thereof and being in turn connected to any suitable form of gearing and thence to the steering shaft 17 at one side of the vehicle and extending to the rear thereof being equipped at its rear end with the hand steering wheel 18.

The usual gear operating controls are provided as will be understood, so that thus far what has been described is in some respects a standard vehicle, the bogies 5 and 6 being pivotally supported on the rear axle and the steering being effected in the usual manner by the wheels 3 and 4, the drive of the vehicle obviously being carried out by the motor 15.

Since the particular vehicle here shown and being described, is found most suitable for use as a trencher, the trenching mechanism at the rear thereof and generally denoted 20, includes the wheel supporting frame 21 which may be of conventional and known form, said frame 21 being equipped so as to support the trenching wheel 22 having the usual digging buckets 23 thereon. Suitable drive means for the wheel are in part supported by the frame as indicated at 24 and driven from the engine 15 of the vehicle as by means of the chain 25 and any conventional form of gearing not particularly illustrated herein.

In order to support the trenching unit 20 at the rear of the vehicle, a suitable frame work may be provided, and in this particular instance is shown as comprising a pair of tubular upright supports both designated 26, which are in turn connected at their lower ends to the frame work of the machine in any preferred manner, and at their upper ends being connected from the top thereof to the forward part of the frame as by means of the braces 27 in any preferred manner to provide a rigid unit.

In order to provide for raising and lowering of the trenching unit 20, suitable operating instrumentalities are provided and generally designated 28, other parts of the instrumentalities being designated 29, operation of the same being carried out as desired and preferably by hydraulic means, all of the foregoing instrumentalities and parts of the trenching wheel forming only an incidental part of this invention and therefore being only generally shown and described. It should be noted however of course that the trenching wheel unit 20 is adapted to be raised and lowered into and out of the ground so as to dig a trench in the usual manner.

At the rear of the machine and supported on the frame work in a suitable manner is an operator's station 30 to which all of the various controls for the machine are directed and from whence steering and other operating phases of the machine are carried out.

As shown in FIGURE 5 the braking system of the machine may be of substantially conventional form including the hydraulic lines illustrated in general at 31, those for the wheels 7 and 9 being connected to be controlled by one of the control members indicated at 32, the wheels 8 and 10 as far as braking is concerned being controlled by the control member 33 at the operator's station. Reference may be had at this point to FIGURE 4 which shows these operating controls 32 and 33 on the bank of hydraulic control levers which are availed of only some of which are shown in order to simplify the disclosure herein. It should be understood that by manipulation of the lever 32 the brakes may be applied at the wheels 7 and 9 so as to stop or slow those wheels down and correspondingly the wheels 8 and 10 may be stopped or slowed down by operation of the lever 33. Normally the levers will be operated together during travel movement of the machine but it should be understood that one of the features of this invention is that these levers may be separately operated for purposes to be hereinafter set forth.

Figure 3:
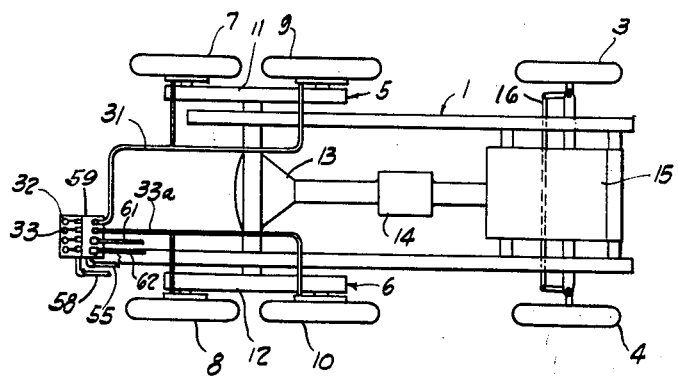
FIGURE 3 is a top plan view somewhat fragmentary in nature and somewhat enlarged, more clearly illustrating certain of the control parts with operating means controlled thereby.

Reference may now be had to FIGURES 1, 3, and 4 in particular, which may be used to describe the portions of the machine which are availed of to enable positioning of the machine in the various positions shown in FIGURES 6, 7 and 8 in the drawings.

Each of the bogies or drive units 5 and 6 is equipped with a hydraulic piston and cylinder unit, that for the unit 5 being designated 35 and that for the unit 6 being designated 36. The hydraulic piston and cylinder units 35 and 36 are in each case connected in exactly the same manner to respective bogies and to the frame of the machine and thus only one will be described as being exemplary.

For example the hydraulic piston and cylinder unit 36 is shown as including the piston rod 38 therein, the lower end of the piston rod 38 being conected at 40 to ears or extensions upwardly of the beam 12 said ears being denoted 42. At the upper end of the piston and cylinder unit 36, the cylinder body 44 is shown as being equipped with a portion 46 adapted to be received between similar ears 48, which extend forwardly from arms 50 connected to the upright members 26. The piston and cylinder unit 35 is connected to the frame in the same manner, the respective corresponding parts being designated 37 for the piston rod, 39 for the pivotal connection and 41 for the ears connected to the beam 11 of the bogie 5. The upper end of the piston cylinder unit 35 is similarly connected to the extension 51 of the corresponding upright 26 as by means of the part 47 connected to the cylinder body and the ears 49 extending from the extension 51.

Each of the piston and cylinder units 35 and 36 is a double acting unit, and leading to the lower portions thereof so as to be below the head of the piston connected to the piston rod 37, is a hydraulic line 54, which leads to a common supply line 55. The upper ends of the piston and cylinder units 35 and 36 are provided with hydraulic line 57 connected to a common line 58, the admission of fluid to the line 58 obviously causing outward movement of the pistons and thus the rods connected thereto and conversely the admission of fluid to the line 55 causing inward movement of the pistons and rods 37 and 38 connected therewith.

As shown in somewhat greater detail in FIGURE 4, the lines 55 and 58 lead to a control station or panel previously indicated and here denoted 59, same involving and incorporating therein the usual four-way control valves. In order to supply hydraulic fluid under pressure, a pump such as 60 may be provided, connected by means of the line 61 to the valves within the control panel 59, there being a return line 62 from the panel leading to a reservoir 63. All of the foregoing hydraulic instrumentalities are generally well known and thus no specific details of the same are set forth or shown. However it will be understood that manipulation of the valve lever such as indicated at 64 for example which we shall assume is for control of admission of fluid to the line 55, will cause fluid to be admitted to the lower ends of the piston and cylinder units 35 and 36, causing the piston rods 37 and 38 thereof to be withdrawn into the cylinder portion, and since the piston rods 37 and 38 are conencted to the beams 11 and 12 of the bogies 5 and 6 respectively, the bogies will be pivoted into a position as for example that shown in FIGURE 8, whereby the wheels 9 and 10 will be raised out of contact with the ground.

When the fluid is permitted to return back through the line 55, as by manipulation of the lever 64 in a suitable manner, obviously the fluid will be moving in such a manner as to permit the flow back to the control panel 59 and thence to the reservoir 63 in turn providing for pivotal movement of the bogies 5 and 6 back to their normal positions for example as shown in FIGURE 6.

When fluid is admitted to the line 57, as by manipulation of a lever 65 which is for control of such fluid flow to the line 58, the fluid flowing through the line 58 will be admitted above the piston in the cylinder units 35 and 36 and cause an outward movement so to speak of the piston rods 37 and 38, in turn simultaneously causing pivotal movement of the frame of the machine as shown in FIGURE 7 so that the front steering wheels 3 and 4 thereof may be raised off of the ground. It should be clearly understood that intermediate positions of the piston rods 37 and 38 with respect to their respective cylinder 35 or 36 are contemplated, and will depend on the operator, the terrain, or other conditions which may be encountered.

Reverting for the moment to the disclosure of FIGURE 5 it should be understood that the brakes for the wheels 7 and 9 are controlled by admission of fluid to the line 31 under the control of the lever 32. Similarly the admission of fluid to the line 33a will regulate admission of fluid to the brakes for control of the wheels 8 and 10 and thus the braking effect may be divided as has heretofore been explained.

As indicated in FIGURE 4 these respective brake lines lead to the control panel bank 59, and when the vehicle is in the position as shown in FIGURE 7 with the forward end thereof raised off of the ground, steering of the unit may be undertaken by means of admission of fluid to either of the lines 31 or 33a. When it is desired to turn toward the left for example fluid will be admitted or the brakes operated for the wheels 7 and 9, slowing the wheels down and admitting drive to be directed to the wheels 8 and 10 causing movement of the machine leftwardly. Obviously the converse will take place.

It should be noted that when the vehicle is in the position of FIGURE 7, wherein the forward steering wheels 3 and 4 are raised off of the ground, substantially all of the weight of the machine and its appurtenances is carried upon the driving wheels of the respective bogies 5 and 6. This is true particularly if the digging unit 20 is not active, or in the alternative if the digging unit 20 has reached the lower extent of its normal movement, by raising the vehicle so to speak or at least the forward end thereof to the position shown in FIGURE 7 greater depth of digging may be accomplished because the supports 26 for the trenching unit 20 are angularly positioned. It is clear that adjustment of the digging depth is thereby accomplished by this phase of adjustment also. This adjustment can be to an innumerable number of positions within the total extent of movement of the pistons 37 and 38 and cylinders 35 and 36. At the same time that these two functions are capable of being carried out, it will be apparent that the driving or tractive force of the machine is all concentrated through the wheels as normally, but the weight of the machine is in essence added to the wheels of the bogies 5 and 6 and thus the tractive effort is enhanced by that weight, this particularly taking place and being desirable where difficult conditions of ground are encountered as where it is muddy or other obstructions are reached which require that greater traction should be delivered by the driving wheels.

Conversely under some circumstances it has been found desirable to raise the forward wheels 9 and 10 of the bogies 5 and 6 from the ground into the position as shown in FIGURE 8, so as to rise over an obstruction and at the same time control the movement of the digging wheel 20 in the ground, and thus the manipulation shown is resorted to.

Ordinarily during normal travel movement of the machine, the hydraulic piston and cylinder units 35 and 36 may be placed in condition so that neither resistance to or movement of the respective piston rods and cylinders therein is encountered, and so that normal rocking movement of the respective bogies may take place, thus accommodating the machine to the terrain and providing for very close control of the digging depth to which the wheel of the unit 20 is set.

During such latter movement as above expressed wherein the piston and cylinder unit 35 and 36 may be inactive so to speak, the steering of the vehicle may be effected by the hand steering wheel 18, which manipulates the usual steering appurtenances of the wheels 3 and 4. However in this latter condition, it is often necessary to effect more rapid steering of the machine and thus the ability to control the respective wheels of the bogies 5 and 6 individually is also called into play as by manipulating the levers 32 and 33 as will be apparent.

In view of the foregoing explanation it will be clear that the normal arrangement of the respective travel and supporting elements of the vehicle, is adaptable for other uses than that with a trenching machine. However, as has been suggested the use with a trenching machine of the type disclosed has been found particularly advantageous and the use of the wheeled bogies of the tandem type has been found further useful in difficult travel conditions, and in many cases being effectively used where tracks of the normal type are not usable. The control that is provided for in this vehicle is shown to be of particular advantage, and where bogies of the nature described are availed of accurate and simple control of the weight distribution and digging depth may be effected as by the hydraulic piston and cylinder units or other similar elements which might be used to take their places.

It should be pointed out that while hydraulic instrumentalities are shown for the various operating means, other comparable and similar units might be availed of, the motor of the vehicle being obviously availed of to drive the hydraulic pump 60 referred to or other mechanical equivalents thereof.

The ability of the machine to travel at both high and low speeds in moving from place to place and at its operating location, is remarkably enhanced by the arrangement hereinabove described, with the ability to shift the weight which is transferred or supported by the driving wheels being of essential importance herein.

We claim:

1. In a machine of the class described, in combination a frame, bucket ditching instrumentalities carried by the frame, front steering wheels connected to said frame, rear driving wheels connected to the frame, all of said wheels normally engaging the ground, said driving wheels arranged in tandem at each side of the frame on beams, at least a pair of wheels carried by each beam, said beams pivotally mounted on said frame on an axis transverse to the longitudinal axis of the frame, traction drive means for said driving wheels and drive means for said ditching instrumentalities, said driving wheels including selectively operable brake means to selectively assist in steering said machine, and adjusting means including parts movable to an infinite number of positions within limits inter-connecting the frame and beams to permit relative pivotal movement between said beams and said frame to shift the weight of the machine with respect to the wheels whereby to vary the tractive effective on the driving wheels and the attitude of the ditching instrumentalities with respect to the ground.

2. The invention defined by claim 1 wherein said adjusting means comprises hydraulic piston and cylinder units, said adjusting means including selectively operable control means to effect operation of said units to control said relative pivotal movement of the frame and beams.

References Cited in the file of this patent

UNITED STATES PATENTS

| | | |
|---|---|---|
| 520,916 | Dalton | June 5, 1894 |
| 894,713 | Wyman | July 28, 1908 |
| 1,183,669 | Rider | May 16, 1916 |
| 1,404,631 | Molesworth | Jan. 24, 1922 |
| 1,625,912 | Rolph | Apr. 26, 1927 |
| 1,769,074 | Ruatti | July 1, 1930 |
| 2,368,360 | Hollman et al. | Jan. 30, 1945 |
| 2,721,405 | Gardner | Oct. 25, 1955 |
| 2,882,623 | Gardner | Apr. 21, 1959 |